(12) United States Patent
Singh et al.

(10) Patent No.: US 8,769,148 B1
(45) Date of Patent: Jul. 1, 2014

(54) TRAFFIC DISTRIBUTION OVER MULTIPLE PATHS IN A NETWORK

(75) Inventors: Arjun Singh, Mountain View, CA (US); Ashish Naik, Los Altos, CA (US); Subhasree Mandal, San Jose, CA (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 13/192,658

(22) Filed: Jul. 28, 2011

Related U.S. Application Data (60) Provisional application No. 61/369,307, filed on Jul. 30, 2010.

(51) Int. Cl.
*G06F 15/173* (2006.01)

(52) U.S. Cl.
USPC .......................................................... 709/242

(58) Field of Classification Search
USPC .......... 370/351, 360, 393, 392, 389; 709/223, 709/224, 225, 226, 242
See application file for complete search history.

(56) References Cited

U.S. PATENT DOCUMENTS

| | | | |
|---|---|---|---|
| 6,266,706 B1 | 7/2001 | Brodnik et al. | |
| 6,347,078 B1 | 2/2002 | Narvaez-Guarnieri et al. | |
| 6,385,649 B1 | 5/2002 | Draves et al. | |
| 6,567,382 B1 | 5/2003 | Cox | |
| 6,665,297 B1 | 12/2003 | Hariguchi et al. | |
| 6,721,800 B1 | 4/2004 | Basso et al. | |
| 6,754,662 B1 | 6/2004 | Li | |
| 6,778,532 B1 | 8/2004 | Akahane et al. | |
| 6,956,858 B2 | 10/2005 | Hariguchi et al. | |
| 7,190,696 B1 | 3/2007 | Manur et al. | |
| 2002/0176363 A1 | 11/2002 | Durinovic-Johri et al. | |
| 2005/0041590 A1 | 2/2005 | Olakangil et al. | |
| 2005/0111433 A1 | 5/2005 | Stewart | |
| 2006/0133282 A1 | 6/2006 | Ramasamy | |
| 2006/0291392 A1 | 12/2006 | Alicherry et al. | |
| 2008/0008178 A1 | 1/2008 | Tychon et al. | |
| 2008/0013552 A1 | 1/2008 | Wright et al. | |
| 2009/0041049 A1* | 2/2009 | Scott et al. ..................... | 370/419 |
| 2011/0134924 A1* | 6/2011 | Hewson et al. ................ | 370/392 |

OTHER PUBLICATIONS

Traw et al., "Striping Within the Network Subsystem", IEEE Network, pp. 22-32(1995).

* cited by examiner

*Primary Examiner* — Chandrahas Patel
*Assistant Examiner* — Lan Huong Truong
(74) *Attorney, Agent, or Firm* — Lerner, David, Littenberg, Krumholz & Mentlik, LLP (57) ABSTRACT

System and methods for efficiently distributing data packets in a multi-path network having a plurality of equal cost paths each having the same number of hops are provided. In one aspect, a system and method includes reordering the entries in the routing table of one or more peer routing devices, such that succeeding equal cost next hop routing devices that are interconnected in a Clos formation to the peer routing devices received unbiased traffic from each of the peer routing devices, thus enabling the succeeding next hop routing devices to distribute data traffic evenly over additional equal cost multiple hops further into the network.

17 Claims, 10 Drawing Sheets

TRAFFIC DISTRIBUTION OVER MULTIPLE PATHS IN A NETWORK

CROSS-REFERENCE TO RELATED APPLICATIONS

The present application claims the benefit of U.S. Provisional Application No. 61/369,307, entitled "SYSTEMS AND METHODS FOR TRAFFIC DISTRIBUTION OVER MULTIPLE PATHS IN A NETWORK" filed Jul. 30, 2010 the entire disclosure of which is hereby incorporated herein by reference.

FIELD

The present disclosure generally relates to network communications, and more particularly to systems and methods for efficiently distributing data packets over multiple paths in a network.

BACKGROUND

Routing devices are components in a packet based networks for interconnecting and enabling communication between hosts devices located at different nodes of the network. A packet based network can have many intervening routing devices located at intermediate nodes of the network, and data packets that are transmitted by a source device or host at one node of a network may traverse many routing devices or "hops" till they are routed to an intended destination device or host located at another node of the network.

One of the functions of a routing device is to forward data packets received at an input port of the routing device to a succeeding next hop device connected to one of the outgoing ports of the routing device. In this manner, the data packets are transmitted from one intervening next hop routing device to another, till the data packets finally reach the next hop routing device that is typically closest to the destination device and can deliver the data packets to the destination device without having to route the packets to any other routing devices. When a data packet is received at an input port of a routing device, the routing device determines (typically via a routing table) the succeeding or next hop routing device from a plurality of next hop routing devices to which the data packet may be routed to reach the intended destination device.

Uneven distribution of data packets flows at one or more intermediate routing devices may cause some paths to saturate earlier than others thereby reducing the overall capacity of the network.

SUMMARY

Aspects of this disclosure are employed for distributing data packets over multiple paths in a network.

In one aspect, a method for distributing data packets from a first set of routing devices to a second set of routing devices interconnected with the first set of routing devices in a multi-path network is provided. The method includes rotating, with one or more processors, entries in a routing table of at least a given one of the first set of routing devices, such that when data packets that hash to a given hash value are received at respective input ports of different ones of the first set of routing devices, each of the different ones of the first set of routing devices is configured to select a corresponding outgoing port that is interconnected to a different one of the second set of routing devices. The method further includes receiving a data packet at a specific one of the respective input ports of the given one of the first set of routing devices, computing a hash value of the received data packet using a hashing function, selecting, based on the rotated entries and the computed hash value, the corresponding outgoing port of the given one of the first set of routing devices, and routing the data packet via the selected outgoing port of the given one of the first set of routing devices to the different one of the second set of routing devices over the network.

In another aspect, a system for distributing data packets over a multi-path network is provided. The system includes one or more processors and a memory storing instructions and data. The data includes a routing table for a given one of a first set of routing devices interconnected in a network to a second set of routing devices. The instructions, when executed by the one or more processors, cause the one or more processors to rotate entries in the routing table of the given one of the first set of routing devices, such that when data packets that hash to a given hash value are received at respective input ports of different ones of the first set of routing devices, each of the different ones of the first set of routing devices is configured to select a corresponding outgoing port that is interconnected to a different one of the second set of routing devices. The instructions further cause the one or more processors to receive a data packet at a specific one of the respective input ports of the given one of the first set of routing devices, compute a hash value of the received data packet using a hashing function, select, based on the rotated entries and the computed hash value, the corresponding outgoing port of the given one of the first set of routing devices, and, route the data packet via the selected outgoing port of the given one of the first set of routing devices to a different one of the second set of routing devices over the network.

In yet another aspect, a non-transitory computer-readable recording medium having instructions stored thereon is provided. The instructions, when executed by a processor, cause the processor to perform the operations of rotating entries in a routing table of at least a given one of a first set of routing devices, such that when data packets that hash to a given hash value are received at respective input ports of different ones of the first set of routing devices, each of the different ones of the first set of routing devices is configured to select a corresponding outgoing port that is interconnected to a different one of a second set of routing devices interconnected to the first set of routing devices; receiving a data packet at a specific one of the respective input ports of at least the given one of the first set of routing devices; computing a hash value of the received data packet using a hashing function; selecting, based on the rotated entries and the computed hash value, the corresponding outgoing port of at least the given one of the first set of routing devices; and routing the data packet via the selected outgoing port of at least the given one of the first set of routing devices to a different one of the second set of routing devices over the network.

BRIEF DESCRIPTION OF THE DRAWINGS

FIGS. 7A and 7B illustrate additional examples of routing tables in accordance with various aspects of the disclosure.

DETAILED DESCRIPTION

Aspects, features and advantages of this disclosure will be appreciated when considered with reference to the following description of preferred embodiments and accompanying figures. The same reference numbers in different drawings may identify the same or similar elements. Furthermore, the following description is not limiting; the scope of the disclosure is defined by the appended claims and equivalents.

System and methods for efficiently distributing data packets in a multi-path network having a plurality of equal cost multiple paths each having the same number of hops are provided. In one aspect, a system and method includes reordering the entries in the routing table of one or more peer routing devices, such that succeeding equal cost next hop routing devices that are interconnected in a Clos-type formation to the peer routing devices receive unbiased traffic from each of the peer routing devices. This enables the succeeding next hop routing devices to distribute data traffic evenly over additional equal cost multiple hops further into the network, even when the succeeding next hop routing devices use the same hashing function that is used in the preceding peer routing devices.

Figure 1:
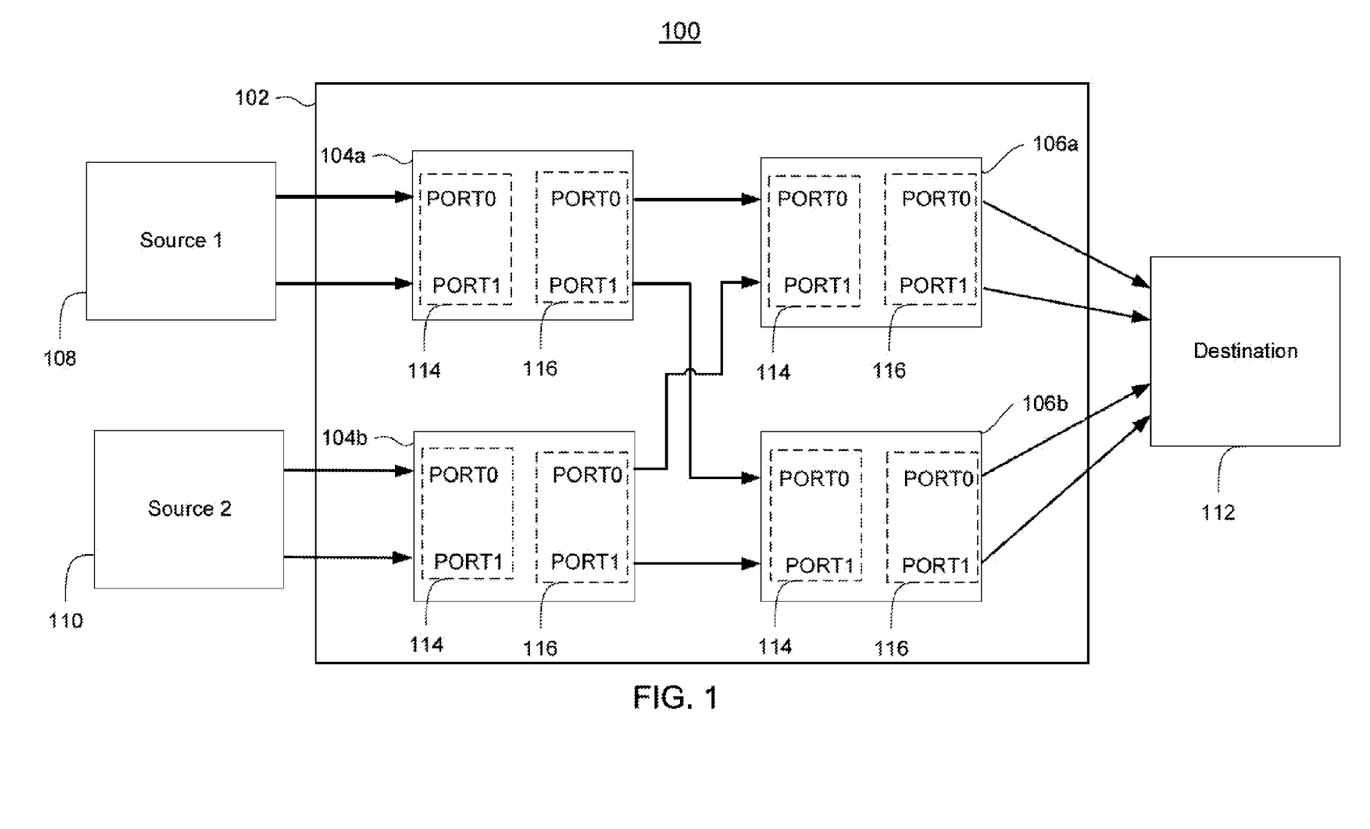
FIG. 1 illustrates an example of a process flow of a system in accordance with an aspect of the disclosure.

FIG. 1 illustrates an exemplary topology of a simplified multi-path ECMP network 100 for interconnecting a plurality of networking devices in accordance with various aspects of this disclosure. As shown, network 100 may include a group 102 of routing devices 104a, 104b, 106a and 106b for routing or forwarding data packets transmitted by source devices 108, 110 to destination device 112. For purposes of explanation and brevity, routing devices 104a and 104b will collectively be referred to herein as "peer routing devices", and succeeding routing devices 106a and 106b will collectively be referred herein to as "next hop routing devices".

Network 100 may be considered an ECMP network because data packets transmitted by source devices 108, 110 may traverse either of two equal cost paths to reach the destination device 112. For example, data packets transmitted by the source device 108 may either traverse routing devices 104a and 106a to reach the destination device 112, or may traverse routing devices 104a and 106b to reach destination device 112. In either case, there are an equal number of hops (in this example, three) between the source device 108 and the destination device 112. Similarly, data packets transmitted by source device 110 may also traverse either of two equal paths each having three hops to the destination device 110, namely routing device 104b to routing device 106a to destination device 112, or routing device 104b to routing device 106b to the destination device 112.

While only a few interconnected networking devices and only two ECMP paths each having three hops are shown in the simplified network 100 of FIG. 1, this is merely for aiding the reader's comprehension. Thus, various implementations of the network 100 may include a large number of interconnected source, destination and routing devices in addition to what is shown in the figure. As a result, the network 100 may also have any number of equal cost paths each having any given number of equal hops between any two interconnected networking devices. Finally, the terms source and destination device are merely used to illustrate the origin and end destinations of a given flow of data packets. Thus, in another aspect, the source and destination devices may themselves be routing devices, and in this case the network 100 may simply represent a portion of a larger network of interconnected networking devices, such as for example, an intranet or the Internet.

Each of the routing devices 104a, 104b, 106a, and 106b may have a number of input or ingress ports for receiving data packets over the network. For example, each of the routing devices 104a and 104b may have two input ports 114, that are each interconnected via appropriate physical links (indicated by the arrows) to respective outgoing ports (not shown) of the preceding source networking devices 108, 110, such that data packets transmitted by the source devices may be received at the respective input ports of the routing devices 104a, 104b over the network. Similarly, each of the routing devices 106a and 106b may also have two input ports 114, that are each interconnected via appropriate physical links (indicated by the arrows) to an outgoing port of the preceding routing devices 104a and 104b, such that data packets transmitted by the routing devices 104a, 104b may be received at the respective input ports of the routing devices 106a, 106b over the network.

In addition, each of the routing devices 104a, 104b, 106a, and 106b may also have a plurality of output or outgoing ports for forwarding or routing data packets to a next hop networking device over the network. For example, each of the routing devices 104a and 104b may have two output ports 116, that are each interconnected via appropriate physical links (indicated by the arrows) to respective ingress ports 114 of the next hop routing devices 106a, 106b. Similarly, each of the routing devices 106a and 106b may also have two output ports 116, that are each interconnected via appropriate physical links (indicated by the arrows) to respective ingress ports (not shown) of the next hop destination device 112.

While FIG. 1 shows routing devices that have only two input and two output ports, this is not intended to be limiting, and the routing devices may have any number of input and output ports that are respectively interconnected, as appropriate, to any number of output and input ports of preceding and succeeding networking devices via appropriate physical links.

In addition to the foregoing description, it can be seen in FIG. 1 that the routing devices 104a, 104b (peer routing devices) and the routing devices 106a, 106b (next hop routing devices) are interconnected in a two-stage Clos formation. This is because each of the peer devices (in the first stage) has one of its outgoing ports 116 interconnected via an appropriate physical link to an input port of each of the equal cost next hop routing devices (in the second stage). As a result, each of the peer routing devices 104a and 104b has a choice to route data packets that are received at an input port of the peer routing device to either one of the equal cost, next hop routing devices 106a or 106b.

While only a two-stage Clos formation is shown in FIG. 1 for ease of understanding, the network may have any number of stages that include routing devices interconnected in a Clos formation. For example, two additional equal cost next hop routing devices (not shown) may easily be added to the network 100 between the next hop routing devices 106a and 106b and destination device 112. In this case, the additional equal cost next hop routing devices may also have two input and output ports, where each of the output ports are interconnected via an appropriate physical link to the respective input ports of the destination device and where the input ports are interconnected in a Clos formation to the output ports of the next hop routing devices 106a and 106b, thus creating a three-stage Clos formation of routing devices. In accordance with this aspect, the number of equal cost paths between each of the source devices and the destination devices now increases to four equal cost paths, and the number of hops that the data packets will traverse from the source devices to the destination device in each of the equal cost paths also increases by one hop to a total of four hops. Other network configurations and arrangements may also be employed.

As indicated before, routing devices may store and use a routing table to route or forward data packets over the network. When a data packet is received at an input port of a receiving routing device, the receiving routing device may use a hashing function to compute a hash value based on information contained in the data packet (e.g., destination address of the data packet). The calculated hash value may then be used as a lookup index in one or more routing tables. The routing tables may be stored internally on the routing device or stored in an external memory associated with the routing device. The hash value is used to determine an outgoing port over which the data packet is then forwarded by the receiving device to an appropriate next hop device, which in larger networks is typically another routing device located closer to the destination device. Due to the limitations in the number of distinct hashing functions that are available, it may be the case that the same hashing function is used in one or more of both the peer and the next hop routing devices.

Thus, in one embodiment, each of the routing devices 104a, 104b, 106a and 106b may use a different routing table to route or forward data packets over the network. In one aspect, the same hashing function may be utilized in each of the peer and the next hop routing devices. In another aspect, one or more of the peer routing devices 104a, 104b may use a hashing function that is the same hashing function as that which is used in one or more of the next hop routing devices 106a, 106b.

Figure 2:
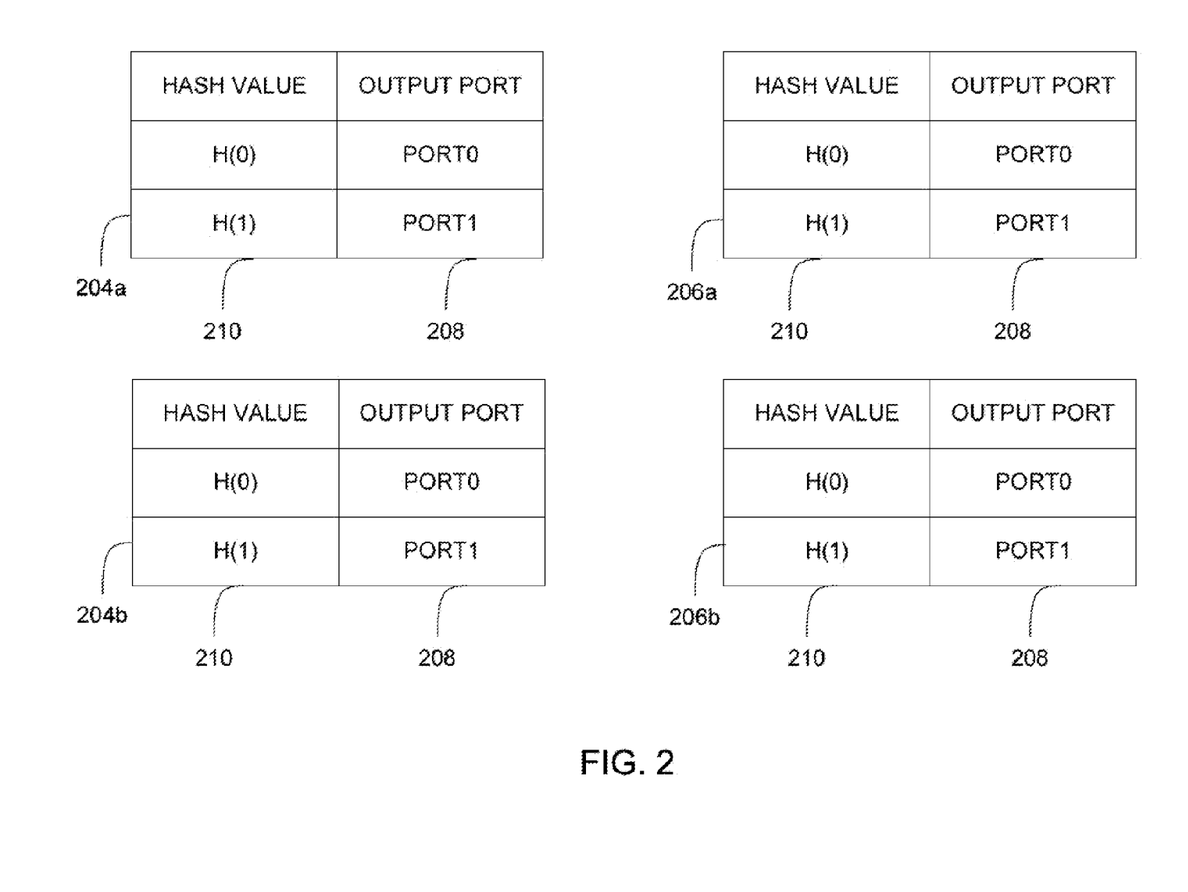
FIG. 2 illustrates an example of a routing table in accordance with the process flow depicted in FIG. 1.

FIG. 2 illustrates examples of original routing tables 204a, 204b, 206a, and 206b that may respectively be provided in each of the routing devices 104a, 104b, 106b, and 106b in the ECMP network 100 of FIG. 1. Each of the routing tables 204a, 204b, 206a, and 206b includes a list of available outgoing ports 208 over which data packets may be forwarded or routed to by the respective routing device to an appropriate equal cost next hop device further into the network. In addition, each of the routing tables also includes a list (e.g., H(0), H(1)) of hash values 210, associated with the outgoing ports 208, that may have been calculated using the same hashing function "H( )" at each respective routing device.

In general, each routing device 104a, 104b, 106a and 106b in FIG. 1 may use the respective routing tables 204a, 204b, 206a and 206b in FIG. 2 to select an outgoing port (port0 or port1) interconnected to one of a plurality of equal cost next hop devices as follows. For example, when one or more flows of data packets is received at any one of the receiving routing devices, the receiving routing device may apply the same hashing function H( ) to each received data packet to calculate a hash value based on information contained in the packets (e.g., destination address, source address, destination port, source port, network protocol etc.). Depending on the calculated hash value (e.g., H(0) or H(1)), that results from the computation using the hashing function, the receiving routing device may then select an appropriate outgoing port associated with the calculated hash value (e.g., port0 or port1) and forward the data packets over the selected outgoing port to an equal cost next hop device in the network.

In accordance with various aspects of the systems and methods disclosed herein, one or more of the peer routing devices may be configured, using hardware, software, or a combination of both, to reorder the routing table used by the respective routing device using a processor. Reordering the entries in the routing tables may, in some circumstances, ensure that each of the peer routing devices provided unbiased data packet traffic to each of the succeeding next hop routing devices. In some cases, one or more of the next hop routing devices may use the same hashing function that is used in one or more preceding peer routing devices. In such cases, providing unbiased data packet traffic to the next hop routing devices by carefully reordering the one or more peer routing tables may enable the next hop routing devices to distribute data traffic evenly over additional equal cost multiple hops further into the network. In particular, such even distribution of data packet traffic over all equal cost paths may be accomplished without requiring any changes in the inputs to the hashing function, and without requiring any additional or uncorrelated hashing functions in any of the routing devices, as described below.

Figure 3:
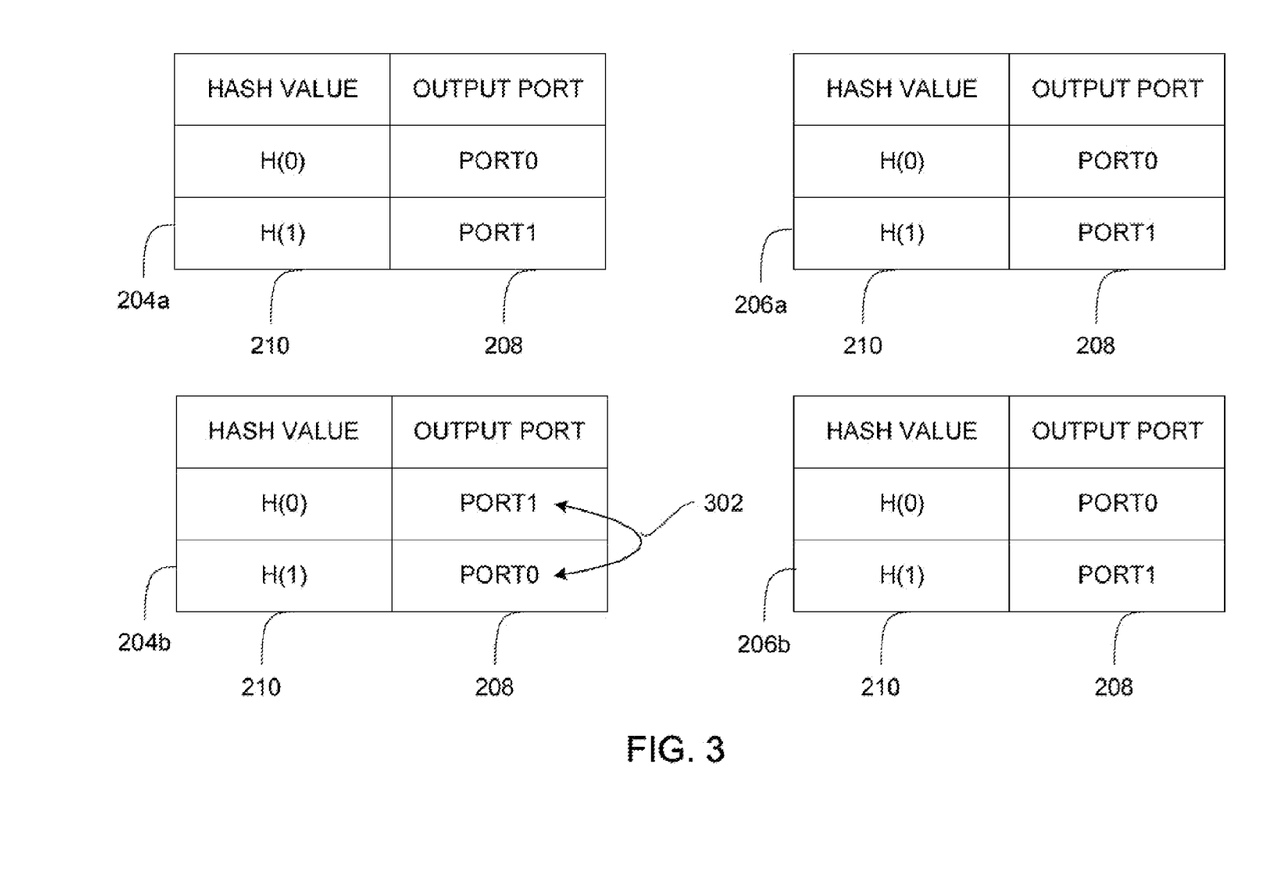
FIG. 3 illustrates an example of a modified routing table in accordance with various aspects of the disclosure.

FIG. 3 illustrates the same routing tables 204a, 204b, 206a and 206b depicted in FIG. 2, except that the routing table entries of the routing table 204b associated with peer device 104b are reordered by rotating each of the ports 208 in routing table 204b by one (as shown by arrows 302). This may be done, for example, by a processor of the routing device. As a result, for a given hash value, each peer routing device will now forward or route data packets associated with that hash value to a different port than it would have otherwise. For example, for a flow of data packets that computes to a hash value of H(0), peer routing device 104a will select port0 as the outgoing port (unchanged), whereas, because of the rotation of the port entries 208 in routing table 204b, peer routing device 104b will now select port1 (instead of the previous port0) as the outgoing port for the same hash value. Of course, in an alternative aspect this result may also be obtained by rotating the hash values 210 in table 204b by one instead of the port entries 208.

Since the peer routing devices 104a and 104b are interconnected with the equal cost next hop routing devices 106a and 106b in a Clos formation as described above, the effective result of the rotation of the port entries (or, equivalently, the hash values) in the manner described above is that data packets that compute to the same hash value (e.g., H(0)) in each peer routing device are now routed or forwarded to different next hop routing devices, instead of the same next hop routing device as would occur if the port entries 208 in routing table 204b were not rotated. Because data packets in each peer routing device that compute to the same hash value may now be routed by the peer routing devices to different next hop routing devices, the peer routing devices now collectively provide unbiased traffic to each of the next hop routing devices. This is now demonstrated below with respect to the exemplary process flow shown in FIG. 4.

Figure 4:
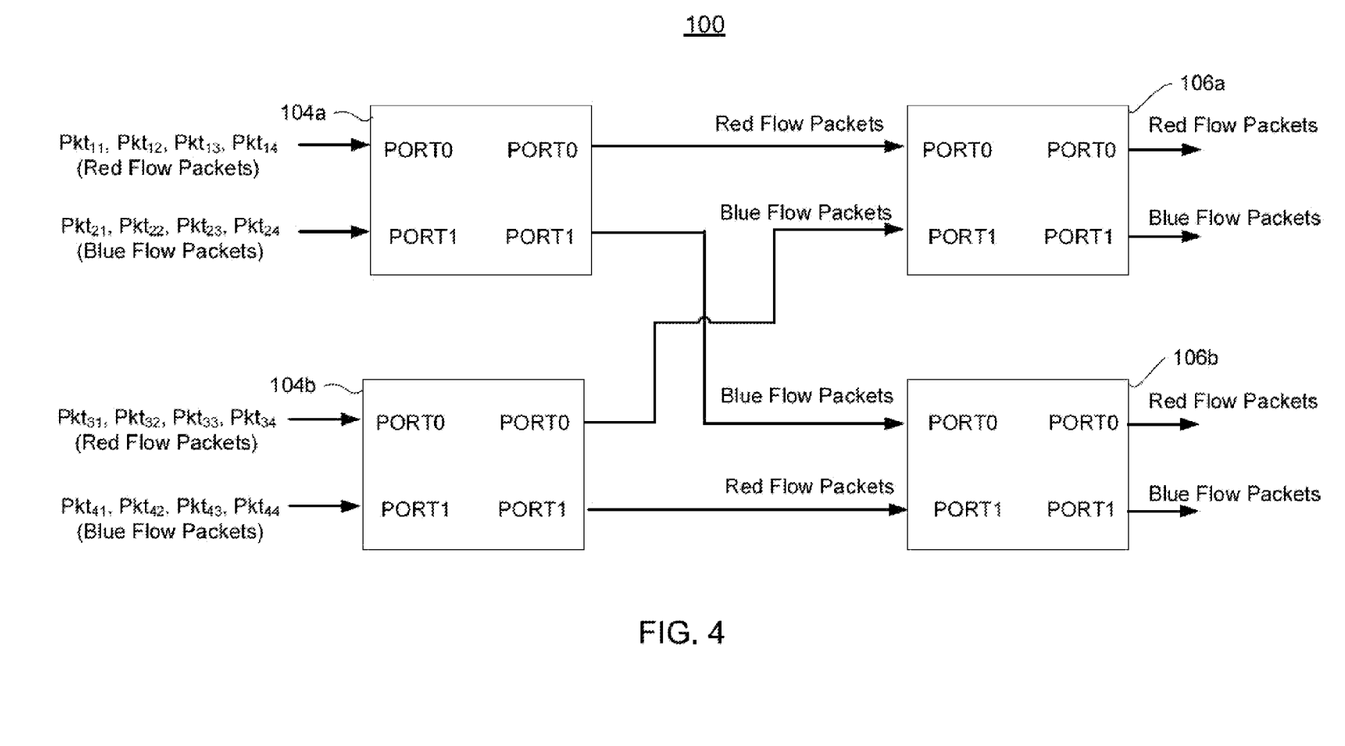
FIG. 4 illustrates an example operation of the system in FIG. 1 in accordance with various aspects of the disclosure.

FIG. 4 illustrates a portion of the network 100 shown in FIG. 1. In particular, FIG. 4 shows the routing devices 104a, 104b, 106a and 106b where each of the peer routing devices (104a and 104b) are interconnected in a Clos formation to each of the equal cost next hop devices (106a and 106b) as before, and where the port entries in the routing table 204b associated with the peer routing device 104b have been rotated as described previously with respect to FIG. 3.

As further illustrated in FIG. 4, each of the two peer routing devices receives two different flows of data packets at its input ports from the preceding source devices (not shown). For example, peer routing device 104a receives a first flow of data packets that includes data packets $Pkt_{11}$, $Pkt_{12}$ $Pkt_{13}$ and $Pkt_{14}$ at input port0, and also receives a second and different flow of data packets that includes data packets $Pkt_{21}$, $Pkt_{22}$ $Pkt_{23}$ and $Pkt_{24}$ at input port1. Similarly, peer routing device 104b receives a first flow of data packets that includes data packets $Pkt_{31}$, $Pkt_{32}$ $Pkt_{33}$ and $Pkt_{34}$ at input port0 and also receives a second and different flow of data packets that includes data packets $Pkt_{41}$, $Pkt_{42}$ $Pkt_{43}$ and $Pkt_{44}$ at input port1.

In addition, it is assumed that each of the first flow of data packets $Pkt_{11}$, $Pkt_{12}$, $Pkt_{13}$ and $Pkt_{14}$ received at peer routing device 104a, and each of the first flow of data packets $Pkt_{31}$, $Pkt_{32}$, $Pkt_{33}$ and $Pkt_{34}$ received at peer routing device 104b, contain information that, when applied to the same hashing function H( ) in each routing device, result in the computation of the same hash value H(0) in each of the routing devices depicted in FIG. 4. Thus, for ease of explanation, the flows of data packets that compute to the same hash value H(0) are each designated as "Red Flow Packets" in FIG. 4.

Similarly, it is assumed that each of the second flow of data packets $Pkt_{21}$, $Pkt_{22}$, $Pkt_{23}$ and $Pkt_{24}$ received at peer routing device 104a, and each of the second flow of data packets $Pkt_{41}$, $Pkt_{42}$, $Pkt_{43}$ and $Pkt_{44}$ received at peer routing device 104b, contain information that, when applied to the same hashing function H( ) in each routing device, result in the hash value H(1) in each of the routing devices depicted in FIG. 4. Thus, for ease of explanation, the flows of data packets that compute to the same hash value H(1) are each designated as "Blue Flow Packets" in FIG. 4.

As can be seen by referring to the routing table 204a in FIG. 3, peer routing device 104a will forward or route all received Red Flow Packets (associated with hash value H(0)) over outgoing port0 to the next hop routing device 106a. Similarly, routing device 104a will also forward or route all received Blue Flow Packets (associated with hash value H(1)) over outgoing port1 to the next hop routing device 106b.

In contrast, because the port entries 208 of routing table 204b have been reordered by rotating the port entries as described above with respect to FIG. 3, peer routing device 104b will route or forward all received Red Flow Packets (associated with hash value H(0)) over outgoing port1 (instead of port0) to the next hop routing device 106b (instead of routing device 106a). Similarly, routing device 104b will also forward or route all received Blue Flow Packets (associated with hash value H(1)) over outgoing port0 (instead of port1) to the next hop routing device 106a (instead of 106b).

As a result of such reordering, each of the next hop routing devices 106a and 106b receives both Red Flow Packets and Blue Flow Packets from the preceding peer routing devices 104a and 104b. In other words, each of the next hop routing devices receives unbiased data packet traffic from the preceding routing devices. Thus, even where the next hop routing devices use the same hashing functions and hash values as the preceding peer routing devices, the next hop routing devices can now efficiently distribute the Red Flow Packets and the Blue Flow Packets over both their respective outgoing ports to additional equal cost next hop devices located further in the network.

Figure 5:
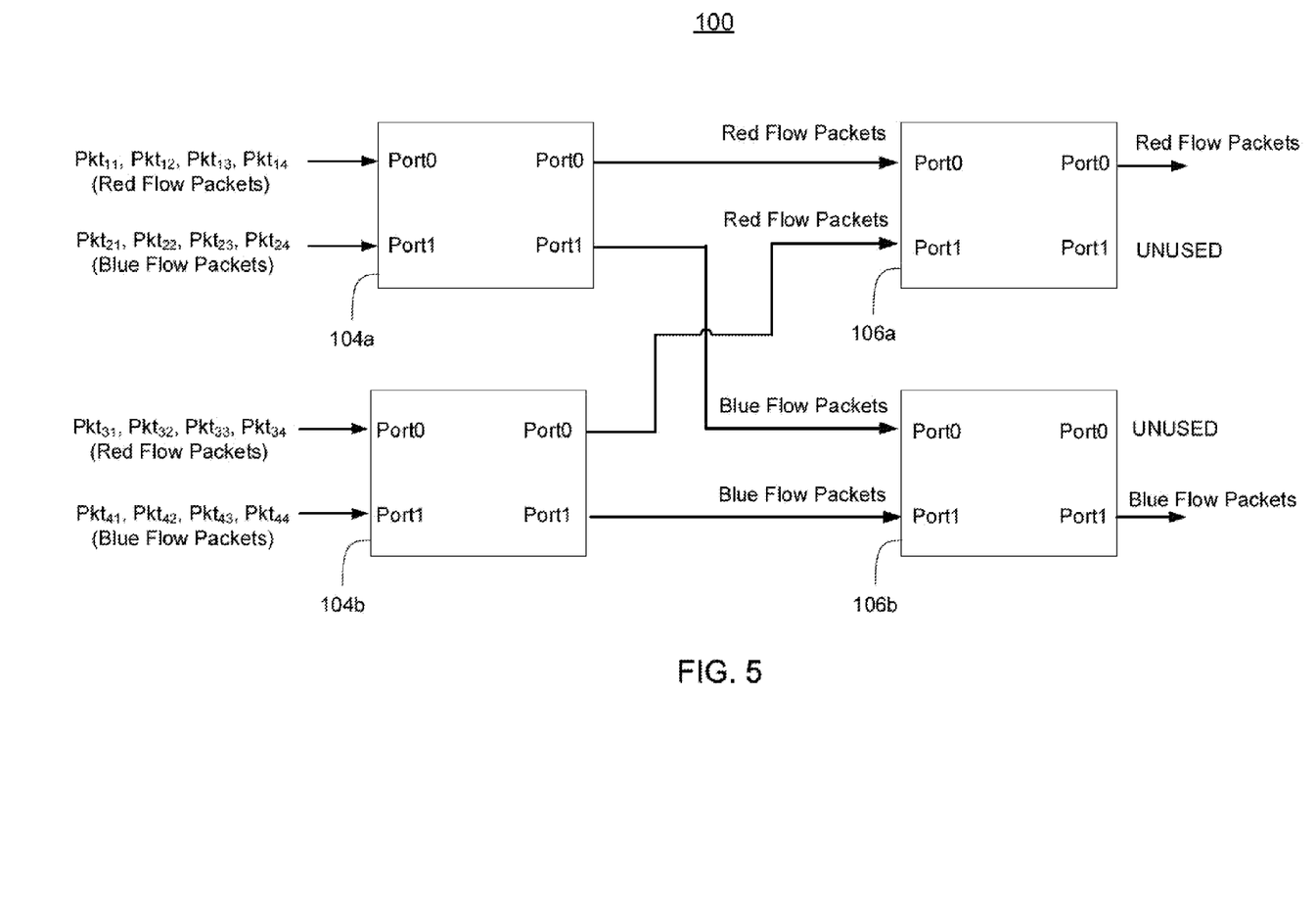
FIG. 5 illustrates a comparative example of the operation of the system in FIG. 1.

In contrast, if the original routing tables illustrated in FIG. 2 were used to route the data packets by the peer routing devices 104a and 104b to the next hop routing devices 106a and 106b, the next hop routing devices would receive biased data traffic from each of the peer routing devices and would be unable to distribute the data packets efficiently to additional equal cost next hop devices. This is illustrated by the exemplary process flow in FIG. 5, which shows that if the original routing tables depicted in FIG. 2 for each of the peer routing devices 104a and 104b are relied upon to route the Red Flow Packets and Blue Flow Packets as described before, each of the next hop receiving devices 106a and 106b will only receive either all Red Flow Packets or all Blue Flow Packets (i.e., biased data traffic) from each of the preceding peer routing devices. As a result, the next hop routing devices 106a and 106b would only be able to forward or route all received packets over just one of the respective outgoing ports, instead of being able to evenly distribute the data packets over all outgoing ports. This may potentially saturate one equal cost path to a destination device, while another other equal cost path to the same destination device is completely unutilized.

The systems and methods disclosed herein may be advantageously scaled to apply to any number of peer routing devices and equal cost next hop devices each having any number of input and output ports that are interconnected in a Clos formation.

Figure 6:
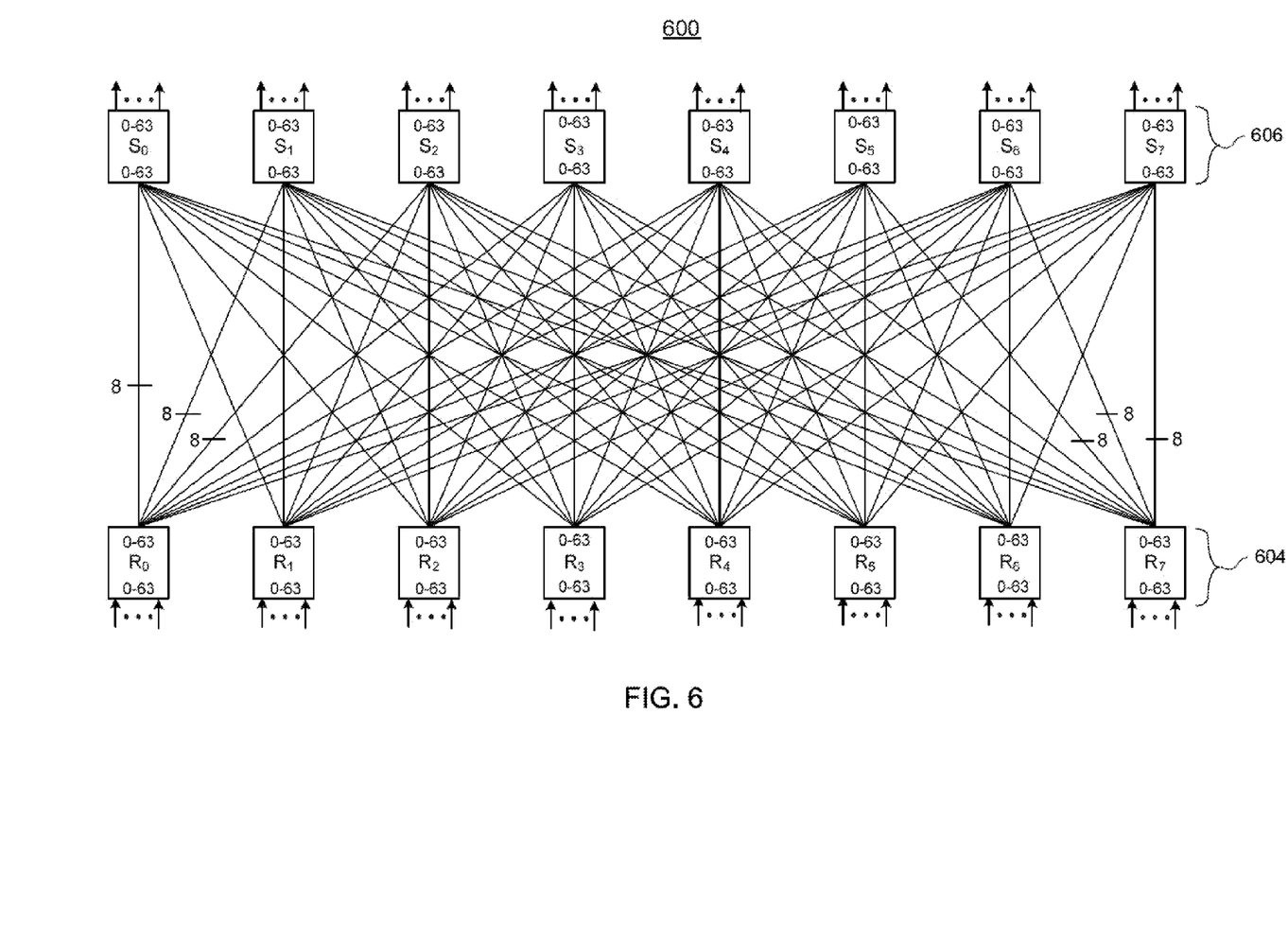
FIG. 6 illustrates an example of a system architecture for use in accordance with aspects of the disclosure.

FIG. 6 illustrates a portion of a multi-path network 600 in which a group 604 of eight peer routing devices $R_0$-$R_7$ are interconnected in a two-stage Clos formation with a group 606 of eight equal cost next hop routing devices $S_0$-$S_7$. In this example, each of the routing devices in group 604 and 606 have sixty four input ports for receiving data packets from preceding network devices and sixty four outgoing ports for routing of forwarding the received data packets further into the network.

As there are sixty four input and outgoing ports in each of the routing devices in groups 604 and 606, the peer routing devices may be connected in a Clos formation where each peer routing device in group 604 has eight of its sixty four outgoing ports attached to each of the next hop routing devices in group 606 via appropriate physical links, such that each peer routing device in group 604 may then forward or route data packets to any of the next hop routing devices in group 606. This is shown in FIG. 6 using lines, where each line represents a set of eight physical links that interconnect a set of eight outgoing ports of each peer routing device to eight input ports for each of the next hop routing devices in a Clos formation (for clarity, only a few lines have been explicitly designated in the figure).

To illustrate using a specific example, eight outgoing ports P.0-P.7 from each peer routing device may be interconnected to the input ports of the next hop routing device $S_0$. Similarly, the next eight outgoing ports P.8-P.15 from each peer routing device may be interconnected to the input ports of the next hop routing device $S_1$, and so on until all of the sixty four outgoing ports of each of the peer routing devices have been interconnected to all sixty four input ports of each of the next hop routing devices in a Clos like formation.

As before, the routing table entries in one or more of the peer routing devices may now be reordered such that for a given hash value, each peer routing device routes data packets to a different one of the next hop routing devices. This is shown in FIGS. 7A and 7B, which functionally illustrate the routing table entries and associated hash values for each of 64 outgoing ports of the peer routing devices $R_0$-$R_7$.

As shown, the port entries of each of the peer routing devices $R_0$-$R_7$ may be reordered by an amount calculated using the formula (X/P)*i, where X is the number of input ports at each of the next hop receiving devices (64), P is the number of peer routing devices (8) and i is an index value that identifies each individual peer routing device from $R_0$ to $R_7$. Thus, as $R_0$ has an index value of zero, the routing table of $R_0$ is not reordered and remains the same, while the routing table of $R_1$ is rotated by 8 (64/8*1), the routing table of $R_2$ is rotated by 16 (64/8*2), the routing table of $R_3$ is rotated by 24 (64/8*2) and so on until the routing table of $R_7$ is rotated by 56 (64/8*7).

As can also be seen in FIGS. 7A and 7B, the effect of such rotation is that for a given hash value (e.g., H(0)), each routing device now forwards data packets that hash to that hash value over outgoing ports that are interconnected to different next hop routing devices. Thus, each of the next hop routing devices may now receive unbiased data traffic from each of the peer routing devices as described before. As a result, it is now possible to use the same hashing function in the next hop routing devices as used in one or more of the peer routing devices, and still efficiently distribute data packets over additional equal cost next hop paths further into the network.

While the example embodiments discussed thus far have had an equal number of peer routing devices interconnected in a Clos formation to an equal number of next hop routing devices, this is not a limitation. Rather, according to another aspect it is also possible to interconnect the devices where the number of peer and next hop routing devices is not the same.

Figure 8:
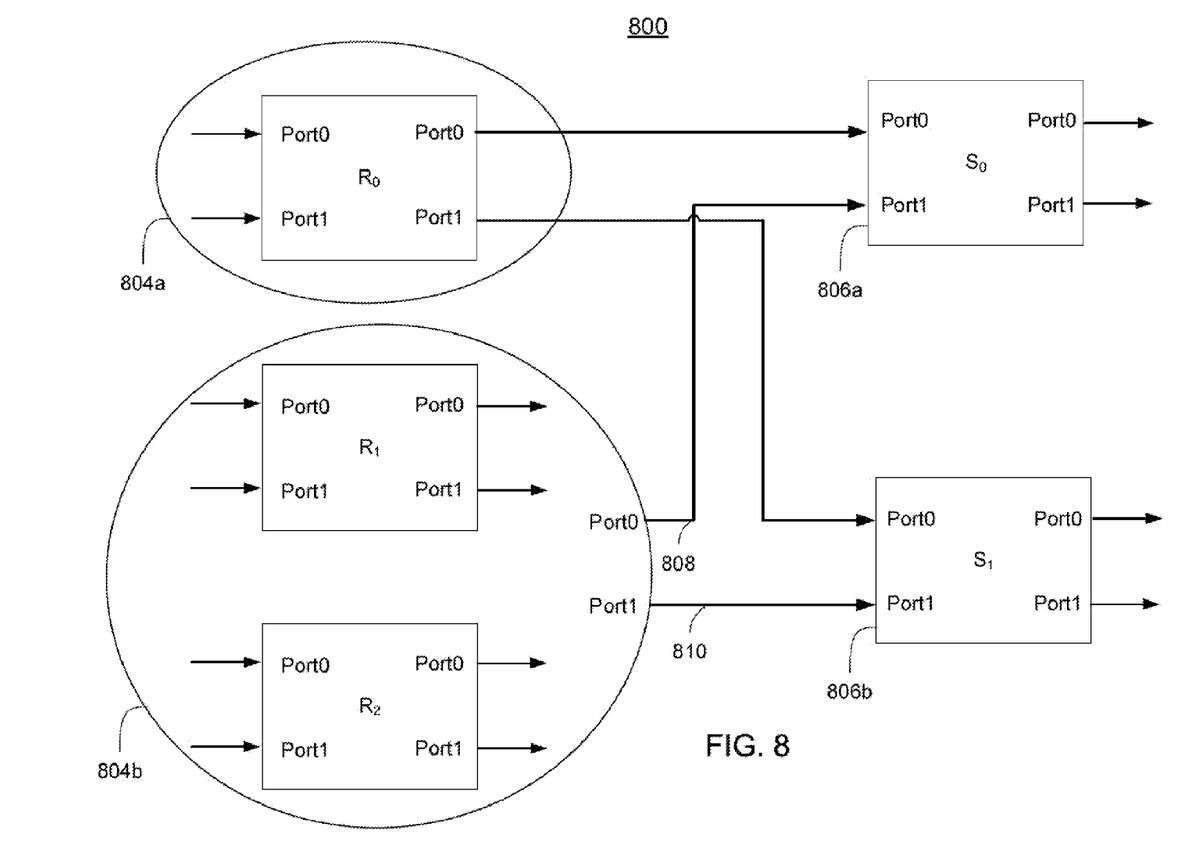
FIG. 8 illustrates yet another example of a system architecture for use in accordance with various aspects of the disclosure.

FIG. 8 illustrates the case where there are three peer routing devices $R_0$, $R_1$, and $R_2$, and two next hop routing device $S_0$ and $S_1$, where each of the routing devices has two input ports and two outgoing ports available for interconnections. Here, the three peer routing devices $R_0$, $R_1$, and $R_2$ may be effectively interconnected to the two next hop routing devices $S_0$ and $S_1$ in a Clos-type formation by forming two virtual groups 804a and 804b of peer routing devices, where the first virtual group 804a includes the peer routing device $R_0$, and the second virtual group 804b includes peer routing devices $R_1$ and $R_2$.

Each virtual group 804a, 804b, may now be interconnected to each of the two next hop routing devices $S_0$, $S_1$ using appropriate physical links, such that the routing devices in each virtual group may effectively transmit data packets to each of the two next hop routing devices $S_0$ and $S_1$. For example, the two outgoing ports of the first virtual group 804a (here, peer routing device $R_0$), may be connected to a respective input port of each of the next hop routing device $S_0$ and $S_1$, such that peer routing device $R_0$ may forward or route data packets to either of the two next hop routing devices $S_0$ or $S_1$.

In addition, the four outgoing ports of the peer routing devices $R_1$ and $R_2$ in the second virtual group 804b may be appropriately striped (e.g., multiplexed), such that in effect the second virtual group 804b also has two outgoing multiplexed ports port0 and port1 that are interconnected to each of the next hop routing devices $S_0$ and $S_1$ via links 808 and 810. For example, if the two outgoing ports of each of the peer routing devices $R_1$ and $R_2$ are port0 and port1 respectively, the two port0 ports may be multiplexed (not shown) to effectively form a single multiplexed outgoing port0. Similarly, the two port1 ports may also be multiplexed (not shown) to effectively form a single multiplexed outgoing port1. Now, the resulting two multiplexed outgoing ports port0, port1, may be individually interconnected via links 808, 810 in a Clos formation to the next hop routing devices, thus enabling both $R_1$ and $R_2$ to route data packets to either of the two next hop routing devices $S_0$ and $S_1$.

In order to enable the two next hop routing devices $S_0$ and $S_1$ to receive unbiased data packet traffic from each of the two virtual groups, the routing table entries in one of the two virtual groups may be reordered. For example, assume that each of the peer routing devices $R_0$, $R_1$, and $R_2$ has a routing table generated using the same hashing function, and each selects port0 if a received data packet hashes to hash value H(0) and selects port1 if a received data packet hashes to hash value H(1).

Here, the routing table entries of each of the peer routing devices $R_1$ and $R_2$ in the second virtual group may be rotated by an equal amount (e.g., by one) such that the two next hop routing devices may now receive unbiased data traffic from each of the two virtual groups in the manner described previously, and for a given hash value, each of the virtual groups forwards or routes data packets to a different one of the next hop routing devices $S_0$ and $S_1$.

In addition, each of the two virtual groups may also be configured to provide an equal or substantially equal amount of unbiased data packet traffic to ensure an equal distribution of data packet traffic from each of the two next hop routing devices further into the network. For example, if peer routing device $R_0$ in the first virtual group is configured to receive and distribute a total of N data packets to next hop routing devices $S_0$ and $S_1$, then $R_1$ and $R_2$ in the second virtual group may each be configured to receive and distribute N/2 data packets each, thus ensuring that each virtual group distributes the same number N of unbiased data packets to each of the next hop routing devices $S_0$ and $S_1$.

In another aspect, the approach described above may be generalized even further to apply to any number P of peer routing devices and any number of S equal cost next hop routing devices, where the number of peer routing devices is greater than or equal to the number of next hop routing devices (P>=S), and where each of the next hop routing devices has at least X input ports which may be interconnected to the outgoing ports of the preceding peer routing devices in a Clos formation.

As before, the number P of the peer routing devices may be grouped into S virtual groups $VG_0$-$VG_{(S-1)}$, where each virtual group may include one or more of the different peer routing devices.

In addition, each virtual group may be interconnected in a Clos formation with each of the S next hop routing devices using the same number of physical links per virtual group. For example, the outgoing ports of the peer routing devices in one or more of the virtual groups may be striped (e.g., multiplexed) as described above, to ensure that each virtual group has the same number of links interconnected to the next hop routing devices, and such that each next hop routing device, in the aggregate, receives a total of X links from the combined virtual groups. As a result, each virtual group may now route or forward data packets to any one of the S equal cost next hop routing devices.

The following procedure may be used to determine the amount by which the routing table entries of each routing table in one or more of the virtual groups may be reordered to ensure that each of the S next hop routing devices receives unbiased data traffic from each of the P peer routing devices over X links. For a given virtual group $VG_i$ in the set of virtual groups $VG_0$ to $VG_{S-1}$, if X>P then rotate each routing table in the virtual group $VG_i$ by the amount (X/P)*i. If X<=P, then rotate each routing table in the virtual group by the amount i mod X. To see how this will ensure that each of the equal cost next hop routing devices will receive unbiased data traffic, consider the following cases.

If X>P, then each of the next hop routing devices will receive X/P links from each of the virtual groups of peer routing devices, for a total of X links in the aggregate. Thus each next hop routing device may now receive unbiased data traffic in the aggregate from the peer routing devices in each of the virtual groups.

If X=P, then, each equal cost next hop routing device will receive exactly one link from each virtual group (again for a total of X links in the aggregate).

Finally, if X<P, since P is a multiple of X, the virtual groups may be determined by having P/X peer routing devices in each virtual group, thus enabling each of the succeeding equal cost next hop routing device to receive unbiased data packet traffic over X links from each of the peer routing devices in each virtual group.

While various aspects have been described in the context where one or more peer routing devices are interconnected in a Clos-type formation with one or more equal cost next hop routing devices, this is not a requirement.

In other aspects, the systems and methods disclosed herein may also be applied in any multi-path network topology where the peer routing devices are interconnected to next hop routing devices in a non Clos-type formation. In this case, the routing table entries of one or more of the peer routing devices may also be rotated in the manner described above, such that, for a given hash value, each peer routing device forwards or routes data packets associated with that hash value to a different next hop device (which may or may not be an equal cost next hop device).

In some circumstances, such as where each of the peer routing devices receives an equal or substantially equal amount of unbiased data packet traffic from one or more preceding network devices, distributing the received data packets over each of the available next hop devices may reduce network latency by ensuring that each available path in the multi-path network (whether equal cost or not) is as evenly utilized as possible to route the data packets to the ultimate intended destination device.

Figure 9:
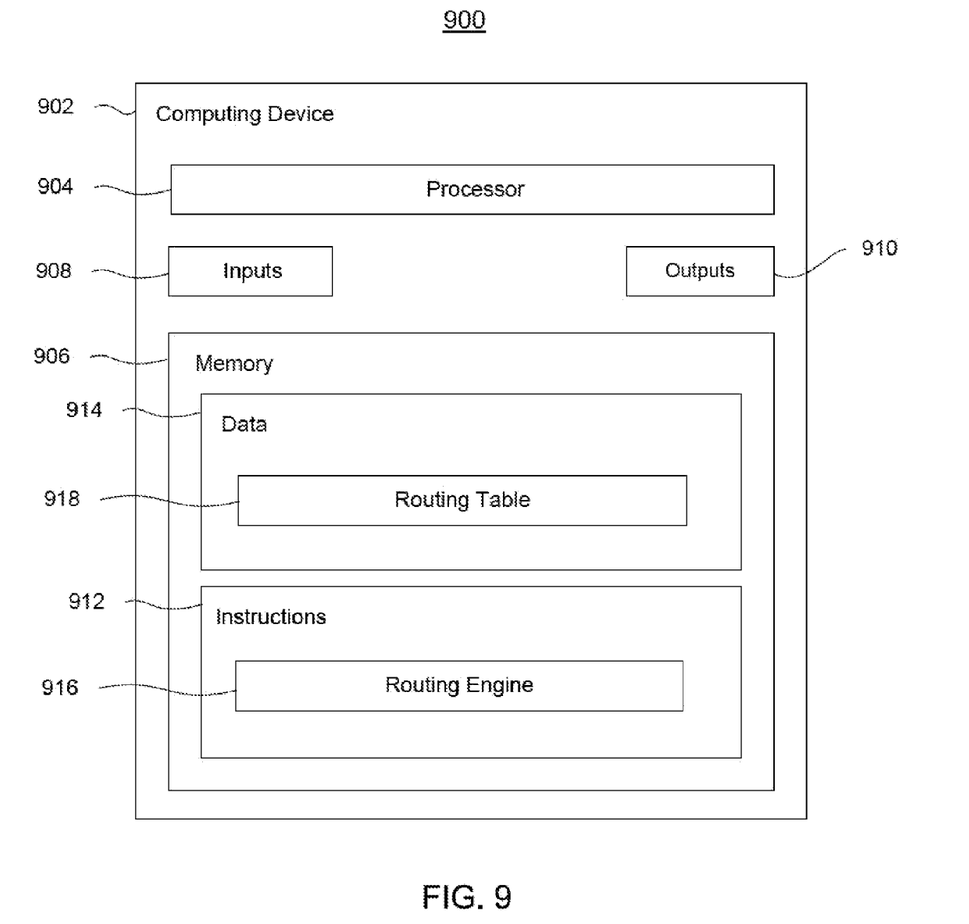
FIG. 9 illustrates an example of a computing device in accordance with aspects of the disclosure.

FIG. 9 illustrates a system 900 in accordance with various aspects of the disclosure. As shown, a computing device 902 contains a processor 904, memory 906, and other peripherals typically present in computing devices, such as an inputs 908 and outputs 910 that enable a user or another device to interact with the computing device.

In one embodiment, the computing device 902 may be a general purpose computer such as a desktop or laptop computer. In other embodiments, computing device 902 may be a routing device, such as a network router, capable of processing instructions and transmitting data to and from humans and to other devices, including other routers, network computers or servers, PDAs with modems, and Internet-capable wireless phones in accordance with various aspects of the disclosure.

The inputs 908 shown in FIG. 9 may include a mouse and keyboard, and may also include other means for inputting information into the computing device, such as, for example, one or more interconnected input or ingress ports that may be used by the computing device to receive information other computing devices.

The outputs 910 may include a monitor, touch screen, speakers, modem, or any other device capable of displaying or transmitting information from the computing device. In addition, the outputs 910 may also include one or more interconnected output or outgoing ports that may be used by the computing device to transmit information to other computing devices.

The processor 904 may comprise a commercially available processor from Intel Corporation or Advanced Micro Devices. Alternatively, the processor may be a dedicated controller such as an application specific integrated circuit ("ASIC"), a field programmable gate array ("FPGA"), complex programmable logic devices ("CPLD") or the like.

The memory 906 may store information accessible by the processor 904, including instructions 912 that may be executed by the processor, and data 914 that may be retrieved, manipulated or stored by the processor 904. In this regard, the memory 906 may be of any type capable of storing information accessible by the processor, such as a hard-drive, memory card, ROM, RAM, DVD, CD-ROM, write-capable memory, read-only memories, etc.

The instructions 912 may comprise any set of instructions to be executed directly (such as machine code) or indirectly (such as scripts) by the processor 904. In that regard, the terms "instructions," "steps", "programs", and "applications" may be used interchangeably herein. The instructions may be stored in object code form for direct processing by the processor, or in any other computer language including scripts or collections of independent source code modules that are interpreted on demand or compiled in advance.

The data 914 may be retrieved, stored or modified by the processor 904 in accordance with the instructions 912. The data 914 may be stored as a collection of data. Moreover, the data 914 may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 9 as being within the same block, the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors, which may or may not operate in parallel.

The computing device 902 may be capable of direct and indirect communication with one or more other computing devices via the interconnected input and output ports. Although only a single computing device is depicted, it should be appreciated that a typical system can include a large number of connected computers and several servers to which the various computing devices can connect, with each different computing device being at a different node of the network.

The network, and intervening nodes, may comprise various configurations and protocols including the Internet, intranets, virtual private networks, wide area networks, local networks, private networks using communication protocols that are open or proprietary to one or more companies, Ethernet, WiFi and Hyper Text Transfer Protocol ("HTTP"). In addition, such communication may be facilitated by any device or component capable of transmitting data to and from other computers, such as modems (e.g., dial-up or cable), networks cards and wireless interfaces.

In one aspect, memory 906 may include routing engine 916 which may suitably programmed or designed to cause the processor 904 to operate in accordance with various aspects of the disclosure. In addition, memory 906 may also include a routing table 918, which may contain information that may be used by the routing engine 916 to route or forward data packets that are received at one or more of the input ports of the computing device 902 to other computing devices interconnected to the computing device via one or more output or outgoing ports of the computing device.

In one aspect, the routing table 918 may include a list of outgoing ports and hash values associated with each of the outgoing ports, where each hash value may have been calculated by the routing engine 916 (executed by the processor) based on an appropriate hashing function implemented by the computing device. In accordance with this aspect, when a data packet is received at an input port of the computing device, the routing engine 918 may determine an outgoing port over which the data packet may be routed to an equal cost next hop computing device in the network in the manner described in detail above. In another aspect, the routing engine 916 may also include the functionality of reordering the entries in the routing table 918 in the manner described above.

In one aspect, one or more computing devices 902 may be interconnected in a Clos formation with other computing devices in FIG. 1. In this regard, each computing device 902 may be, for example, a source device, a destination device, a peer routing device or an equal cost next hop routing device in accordance with various aspects of this disclosure.

While the systems and methods disclosed herein may be particularly advantageous where the computing device is a network routing device such as a router, this is not a limitation, and in one aspect the computing device may be a switching device or chip that is part of a larger switching fabric including a plurality of such chips interconnected in a Clos formation and adapted to operate in accordance with the various aspects of this disclosure. In addition, the processes and operations set forth herein may also be implemented directly by one or more hardware-based processors such as sub-processing units in a multiprocessor array.

Figure 10:
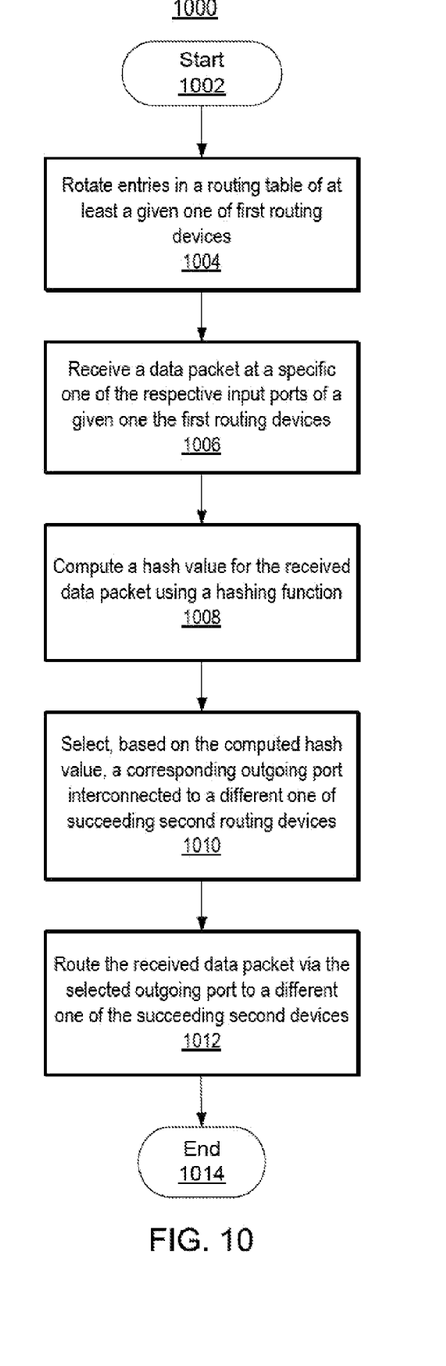
FIG. 10 illustrates an example of a process in accordance with aspects of the disclosure.

A process in accordance with various aspects of the disclosure for distributing data packets from one or more first routing devices to one or more second routing devices in a multi-path network is illustrated as flow diagram 1000 in FIG. 10. In one aspect, the first routing devices may be a plurality of peer routing devices and the second routing devices may be a plurality of succeeding next hop routing devices that are interconnected in a network to the first routing devices. In another aspect, the second routing devices may be equal cost next hop routing devices that are interconnected to the first routing devices, such as in a Clos formation. Each of the first and second routing devices may have a number of input or ingress ports for receiving data packets over the network, and a number of outgoing ports for forwarding the received data packets to succeeding devices further into the network. Each of the first and second routing devices may also include a routing table that includes entries for determining a corresponding outgoing port over which a received data packet that hashes a given hash value is forwarded to a succeeding device further into the network.

The process begins in block 1002. In block 1004, the process rotates entries in a routing table of at least a given one of the one or more first routing devices. For example, each of the one or more first routing devices may include a processor configured to rotate entries in a respective routing table stored in a memory accessible to the processor. As described in detail above, the routing tables for at least one of the one or more first routing devices may be rotated such that each of the first routing devices is configured to route a received data packet that hashes to a same hash value to a different one of the one or more second routing devices over the network.

In block 1006, the process receives a data packet at a specific one of the respective input ports of a given one the one or more first routing devices. For example, one of the first routing devices may receive a data packet from a preceding device that may be a source device or another routing device that is interconnected to the first routing device in the network.

In block 1008, the process computes a hash value for the received data packet using a hashing function. For example, each of the first and second routing devices may implement a hashing function using hardware, software, or combination of both. The hashing function implemented in one or more of the first routing devices may be the same as the one implemented in one or more of the second routing devices. When a data packet is received by a given one of the first routing devices, the receiving first routing device may be configured to compute a hash value for the received data packet based on routing information (e.g., destination address) contained in the data packet.

In block 1010, the process selects, based on the computed hash value, a corresponding outgoing port of the receiving first routing device that is interconnected to a different one of the succeeding second routing devices. For example, the given one of the first routing devices that receives the data packet may perform a lookup in its routing table based on the computed hash value to determine a corresponding outgoing port that is interconnected to a succeeding second routing device in the network.

In block 1012, the process routes the received data packet via the selected outgoing port to a different one of the one or more succeeding second routing devices further into the network. The process ends in block 1014.

The preceding operations do not have to be performed in the precise order described below. Rather, certain operations can occur in a different order or simultaneously.

Although aspects of the disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the disclosure as defined by the appended claims.

The invention claimed is:

1. A method for distributing data packets from a first set of routing devices to a second set of routing devices interconnected with the first set of routing devices in a multi-path network, the method comprising:
   updating a routing table of at least a given one of the first set of routing devices by rotating, with one or more processors, entries in the routing table, the rotated entries including at least one of hash values and output ports, such that when data packets that hash to a given hash value are received at respective input ports of different ones of the first set of routing devices, each of the different ones of the first set of routing devices is configured to select a corresponding outgoing port that is interconnected to a different one of the second set of routing devices;
   receiving a data packet at a specific one of the respective input ports of the given one of the first set of routing devices;
   computing a hash value of the received data packet using a hashing function;
   selecting, based on the rotated entries and the computed hash value, the corresponding outgoing port of the given one of the first set of routing devices;
   routing the data packet via the selected outgoing port of the given one of the first set of routing devices to the different one of the second set of routing devices over the network; and
   updating a second routing table of at least a given one of the second set of routing devices by rotating, with one or more processors, entries in the second routing table, such that when data packets that hash to a given hash value are received at respective input ports of different ones of the second set of routing devices, each of the different ones of the second set of routing devices is configured to select a corresponding outgoing port that is interconnected to a different one of a third set routing devices; wherein the third set of routing devices are interconnected with the second set of routing devices in a Clos formation.

2. The method of claim 1, where each of the second set of routing devices is an equal cost next hop routing device interconnected with each of the first routing set of devices in a Clos formation.

3. The method of claim 1, wherein at least two first routing devices each compute a same hash value using a given hashing function for data packets respectively received by each of the two first routing devices.

4. The method of claim 1, wherein each routing device in the first set of routing devices is in a virtual group of routing devices.

5. The method of claim 4, wherein at least one virtual group of routing devices includes a plurality of routing devices.

6. The method of claim 4, wherein at least one virtual group of routing devices includes a single routing device.

7. The method of claim 1, wherein the rotation of the entries in the routing table of the given one of the first set of routing devices is based upon the quantity of the first routing devices, the quantity of the second routing devices, and the quantity of links interconnecting each of the first routing devices to each of the second routing devices.

8. The method of claim 1, wherein the third set of routing devices are equal cost next hop routing devices.

9. A system for distributing data packets over a multi-path network, the system comprising:
a first memory storing instructions and data, the data comprising a routing table for a given one of a first set of routing devices; and,
one or more processors adapted to execute the instructions, wherein the instructions, when executed by the one or more processors, cause the one or more processors to:
update a routing table of at least a given one of the first set of routing devices by rotating entries in the routing table, the rotated entries including one of a hash value and an output port, such that when data packets that hash to a given hash value are received at respective input ports of different ones of the first set of routing devices, each of the different ones of the first set of routing devices is configured to select a corresponding outgoing port that is interconnected to a different one of a second set of routing devices;
receive a data packet at a specific one of the respective input ports of the given one of the first set of routing devices;
compute a hash value of the received data packet using a hashing function;
select, based on the rotated entries and the computed hash value, the corresponding outgoing port of the given one of the first set of routing devices; and
route the data packet via the selected outgoing port of the given one of the first set of routing devices to a different one of the second set of routing devices over the network;
a second memory storing second instructions and second data, the second data comprising a second routing table for a given one of the second set of routing devices; and,
one or more processors adapted to execute the second instructions, wherein the second instructions, when executed, cause the one or more processors to perform operations comprising:
updating a second routing table of at least a given one of the second set of routing devices by rotating entries in the second routing table, such that when second data packets that hash to a given hash value are received at respective input ports of different ones of the second set of routing devices, each of the different ones of the second set of routing devices is configured to select a corresponding outgoing port that is interconnected to a different one of a third set of routing devices.

10. The system of claim 9, where each of the second set of routing devices is an equal cost next hop routing device interconnected with each of the first set of routing devices in a Clos formation.

11. The system of claim 9, wherein at least two first routing devices each compute a given hash value for data packets respectively received by each of the two first routing devices.

12. The system of claim 9, wherein each routing device in the first set of routing devices is in a virtual group of routing devices.

13. The system of claim 12, wherein at least one virtual group of routing devices includes a plurality of routing devices.

14. The system of claim 12, wherein at least one virtual group of routing devices includes a single routing device.

15. The system of claim 9, wherein the rotation of the entries in the routing table of the given one of the first set of routing devices is based upon the quantity of the first routing devices, the quantity of the second routing devices, and the quantity of links interconnecting each of the first routing devices to each of the second routing devices.

16. The system of claim 9, wherein the third set of routing devices are equal cost next hop routing devices.

17. A tangible non-transitory computer-readable recording medium having instructions stored thereon, the instructions, when executed by a processor, cause the processor to perform the operations of:
updating a routing table of at least a given one of the first set of routing devices by rotating entries in the routing table, the rotated entries including at least one of hash values and output ports, such that when data packets that hash to a given hash value are received at respective input ports of different ones of the first set of routing devices, each of the different ones of the first set of routing devices is configured to select a corresponding outgoing port that is interconnected to a different one of a second set of routing devices;
receiving a data packet at a specific one of the respective input ports of at least the given one of the first set of routing devices;
computing a hash value of the received data packet using a hashing function;
selecting, based on the rotated entries and the computed hash value, the corresponding outgoing port of at least the given one of the first set of routing devices;
routing the data packet via the selected outgoing port of at least the given one of the first set of routing devices to a different one of the second set of routing devices over the network; and
updating a second routing table of at least a given one of the second set of routing devices by rotating, with one or more processors, entries in the second routing table, such that when data packets that hash to a given hash value are received at respective input ports of different ones of the second set of routing devices, each of the different ones of the second set of routing devices is configured to select a corresponding outgoing port that is interconnected to a different one of a third set routing devices; wherein the third set of routing devices are interconnected with the second set of routing devices in a Clos formation.

* * * * *